(12) United States Patent
Wilk et al.

(10) Patent No.: US 7,362,310 B2
(45) Date of Patent: Apr. 22, 2008

(54) SYSTEMS AND METHODS TO MOVE A KEYBOARD

(75) Inventors: Brian A. Wilk, Portland, OR (US);
Shawn S. McEuen, Portland, OR (US);
Justin Huttula, Portland, OR (US);
Alton W. Hezeltine, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 702 days.

(21) Appl. No.: 10/939,559

(22) Filed: Sep. 13, 2004

(65) Prior Publication Data
US 2006/0055675 A1    Mar. 16, 2006

(51) Int. Cl.
*G06F 1/16* (2006.01)

(52) U.S. Cl. .................. 345/168; 345/156; 345/158; 345/169; 345/905; 361/680; 361/681; 361/686

(58) Field of Classification Search ............... 345/156, 345/158, 168, 169, 905; 361/679, 680, 681, 361/686; 455/90, 566, 575
See application file for complete search history.

(56) References Cited

U.S. PATENT DOCUMENTS

| | | | |
|---|---|---|---|
| 6,480,372 B1 | 11/2002 | Vong et al. | |
| 6,727,894 B1* | 4/2004 | Karidis et al. | 345/174 |
| 6,836,404 B2* | 12/2004 | Duarte | 361/680 |
| 7,103,840 B2* | 9/2006 | Ihara et al. | 715/726 |
| 2002/0024499 A1* | 2/2002 | Karidis et al. | 345/156 |
| 2002/0068985 A1 | 6/2002 | Oba et al. | |
| 2003/0073456 A1* | 4/2003 | Griffin et al. | 455/550 |
| 2003/0107871 A1 | 6/2003 | Vathulya | |
| 2004/0130860 A1* | 7/2004 | Vathulya | 361/681 |
| 2004/0145862 A1* | 7/2004 | Hill et al. | 361/681 |
| 2004/0203485 A1* | 10/2004 | Lenchik et al. | 455/90.1 |

* cited by examiner

*Primary Examiner*—Bipin Shalwala
*Assistant Examiner*—Vincent E. Kovalick
(74) *Attorney, Agent, or Firm*—Buckley, Maschoff & Talwalkar LLC

(57) ABSTRACT

According to some embodiments, a keyboard may be moved to a location behind a display.

28 Claims, 10 Drawing Sheets

SYSTEMS AND METHODS TO MOVE A KEYBOARD

BACKGROUND

The differences in usage and functionality between multimedia (e.g., Television (TV), Video-Cassette Recorder (VCR), and Digital-Video Disk (DVD) players) and Personal Computer (PC) devices have all but disappeared. Many electronic components such as display screens and input devices have, for example, evolved to become functional in either a PC or a multi-media environment. Some electronic devices have even been configured to offer the functionality of various multi-media and PC devices in a single device. For example, All-In-One (AIO) and Small Form Factor (SFF) PC devices have transitioned the standard PC into a more space-friendly device that is capable of performing as a PC, a TV, and a DVD player. Such multifunctional machines that attempt to function in both PC and multi-media environments do, however, present difficulties.

DETAILED DESCRIPTION

Figure 1:
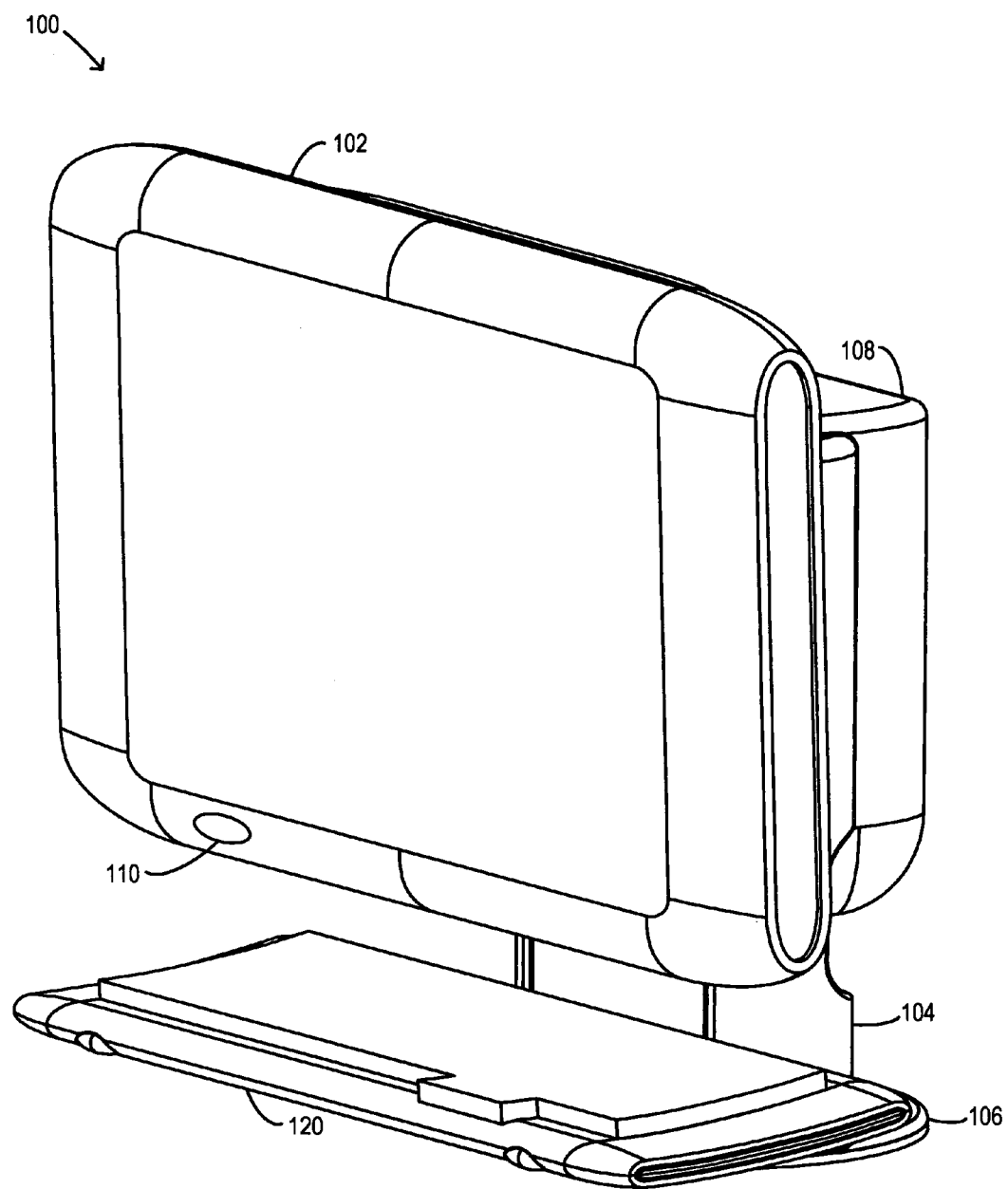
FIG. 1 is a perspective diagram of a system according to some embodiments.

Referring first to FIG. 1, a perspective diagram of a system 100 according to some embodiments is shown. The system 100 may, according to some embodiments, comprise a display 102 and/or a support 104 to support the display 102. In some embodiments, the support 104 may comprise a base 106. The system 100 may also or alternatively, according to some embodiments, comprise a computer chassis 108 (e.g., coupled to the support 104 and/or to the display 102) and/or one or more buttons 110. In some embodiments, the system 100 may comprise a keyboard 120. The system 100 may include fewer or more components than are shown in FIG. 1. The systems (such as the system 100) depicted herein are for use in explanation, but not limitation, of some embodiments. Different types, layouts, quantities, and configurations of systems, components, and/or devices may be used.

According to some embodiments, the system 100 may be or include any type and/or configuration of computer and/or computer component that is or becomes known. The system 100 may, for example, be an AIO and/or SSF PC such as a Gateway® Profile® 5XL-C AIO computer having an Intel® Pentium® 4 3.2 GHz Processor with Hyper-Threading Technology. In some embodiments, the display 102 may be or include any type of display that is or becomes known, such as a nineteen-inch, flat-panel Liquid Crystal Display (LCD). The support 104 and base 106 may be any types of support devices that are or become known or practicable. The support 104 may, for example, be coupled to and/or otherwise integrated with either or both of the display 102 and the computer chassis 108.

The computer chassis 108 may contain, house, and/or otherwise comprise any number, type, and/or configuration of computer components. The computer chassis 108 may, for example, comprise a processor, a disk drive, a memory device, and/or a communication interface or device (none of which are shown in FIG. 1). In some embodiments, the computer chassis 108 may be configured differently than is shown in FIG. 1. For example, the computer chassis 108 may be integrated with the display 102, the support 104, and/or support base 106, and/or may otherwise be located and/or configured in various manners within the system 100. In some embodiments, such as where the system 100 is a display of a desktop computer system, the computer chassis 108 may not be included in the system 100 (e.g., the computer chassis may be separate from the display 102 and associated support 104).

According to some embodiments, the system 100 may include any number of buttons 110. The display 102 may, for example, comprise one or more buttons 110 such as a power button, a menu button, and/or a contrast button. In some embodiments, the button 110 may also or alternatively provide other functionality such as may be associated with performing embodiments described herein. In some embodiments for example, the button 110 may provide an indication that is associated with moving the keyboard 120 (e.g., to a location behind the display 102). According to some embodiments, the button 110 may be located on and/or within other system 100 components in addition to or instead of on the display device 102. In some embodiments for example, the button 110 may be located on the support 104 and/or on the support base 106.

The keyboard 120 may, in some embodiments, be or include any type of keyboard, keypad, and/or other input device that is or becomes known. According to some embodiments, the keyboard 120 may be a wired or wireless keyboard. In some embodiments, the keyboard 120 may be or include any other type or configuration of input device. In some embodiments for example, the system 100 may include a mouse (not shown in FIG. 1) and/or other input device in addition to or in place of the keyboard 120. According to some embodiments, the keyboard 120 may be in wired and/or wireless communication with a computer component (e.g., a processor, a communication device, an input/output device, or a peripheral port) that may, for example, be housed within and/or may otherwise be associated with the computer chassis 108. In some embodiments, the keyboard 120 may be designed to operate in accordance with embodiments described herein. For example, the keyboard 120 may be designed and/or configured to be moved (e.g., to a location behind the display 102) and/or stored. In some embodiments, the keyboard 120 may be configured to couple to a device (described elsewhere herein) to move the keyboard 120.

Figure 2:
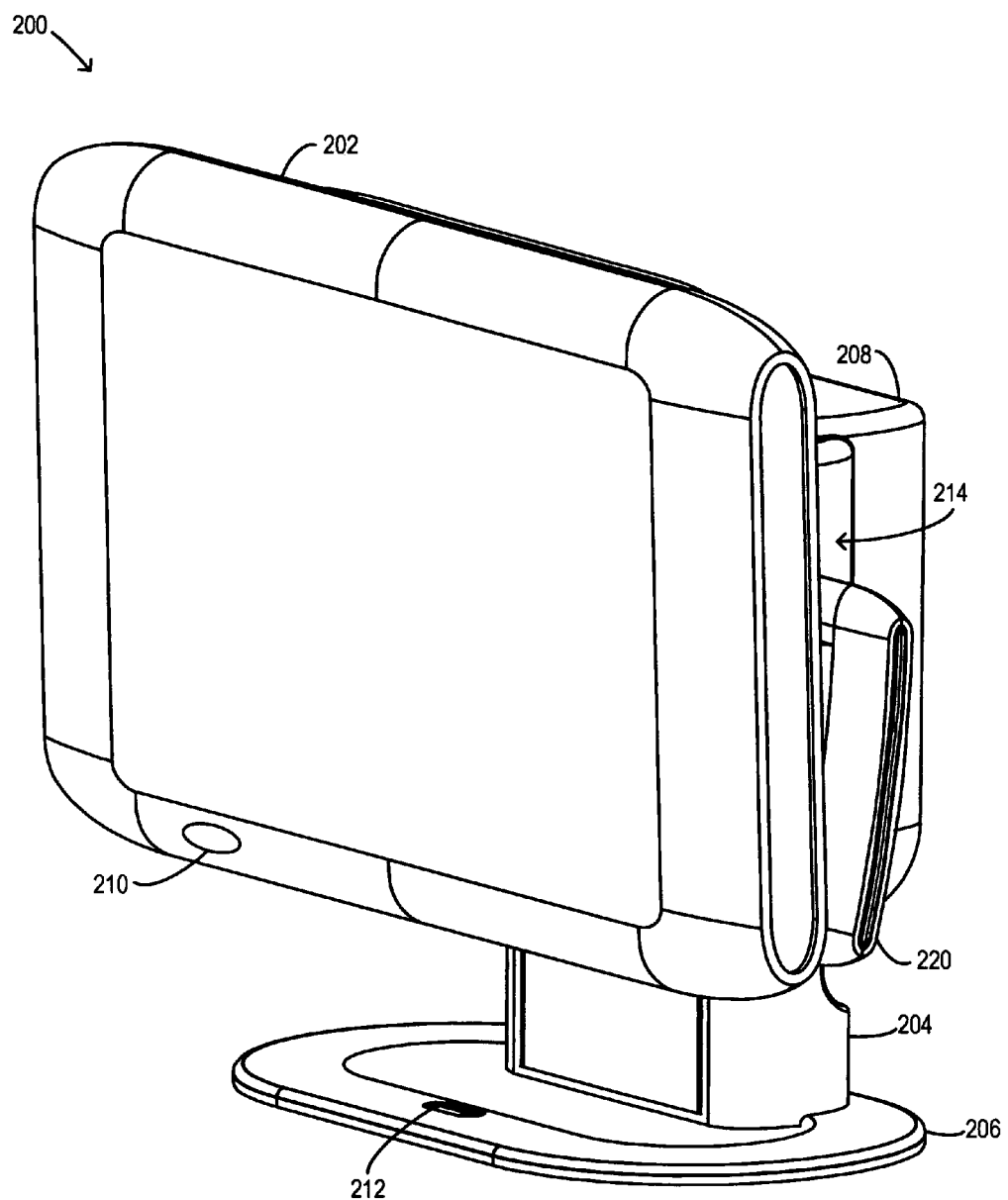
FIG. 2 is a perspective diagram of a system according to some embodiments.

Referring now to FIG. 2, a perspective diagram of a system 200 according to some embodiments is shown. In some embodiments, the system 200 may be similar to the system 100 as described in conjunction with FIG. 1. The system 200 may include, according to some embodiments, a display 202, a support for the display 204, a support base 206, a computer chassis 208, and one or more buttons 210. In some embodiments, the system 200 may also or alternatively include a sensor 212, an area 214 between the display 202 and the support 204, and/or a keyboard 220. According to some embodiments (such as shown in FIG. 2), the area 214 may include a location behind the display 202 where the keyboard 220 may be moved to and/or stored. In some embodiments, the components 202, 204, 206, 208, 210, 220 of the system 200 may be similar in configuration and/or functionality to the similarly-named components described in conjunction with FIG. 1 herein.

According to some embodiments, the keyboard 220 may be moved to a location behind the display 202. As shown in FIG. 2 for example, the keyboard may be positioned at a location in the area 214 between the display 202 and the support 204 and/or the computer chassis 208. In some embodiments, the keyboard 220 may be fully or partially disposed within the area 214. The keyboard 220 may be moved, according to some embodiments, to the location behind the display by manual, mechanical, and/or electronic means. For example, a user of the system 200 may manually move the keyboard 220 to the location behind the display 202. In some embodiments, a device (not shown in FIG. 2) may move the keyboard 220 to the location behind the display 202.

In some embodiments for example, the user may utilize the button 210 to provide an indication that the keyboard 220 is desired to be moved to the location behind the display 202. The device may then, for example, cause the keyboard 220 to be moved to a location behind the display 202. According to some embodiments, the keyboard 220 may automatically be moved to the location behind the display 202. For example, in the case that the keyboard 220 is detected by sensor 212, the device may automatically move the keyboard 220. The user may, for example, place the keyboard 220 on and/or near the sensor 212 so that the keyboard 220 may be detected by the sensor 212. The sensor 212 may then, for example, cause the device to move the keyboard 220 to the location behind the display 202.

The sensor 212 may be or include any type and/or configuration of sensor that is or becomes known. In some embodiments, the sensor 212 may comprise a magnetic sensor that is capable of detecting the keyboard 220. The keyboard 220 may comprise, for example, a magnetic disk or plate (not shown in FIG. 2) configured so that when the keyboard 220 is oriented on and/or near the sensor 212 location, the plate and/or keyboard 220 may be detected by the sensor 212. In some embodiments, the sensor 212 may comprise multiple parts and/or components. In the example using the magnetic plate in the keyboard 220, for example, the sensor 212 may comprise a component such as a magnetic detection device in the support base 206 as well as the plate in the keyboard 220. According to some embodiments, the sensor 212 may include a single device and/or component located on, within, and/or otherwise associated with any of the components of the system 200. The sensor 212 may, for example, be entirely located within the keyboard 220 (e.g., and may wirelessly and/or passively communicate with other system 200 components).

Figure 3:
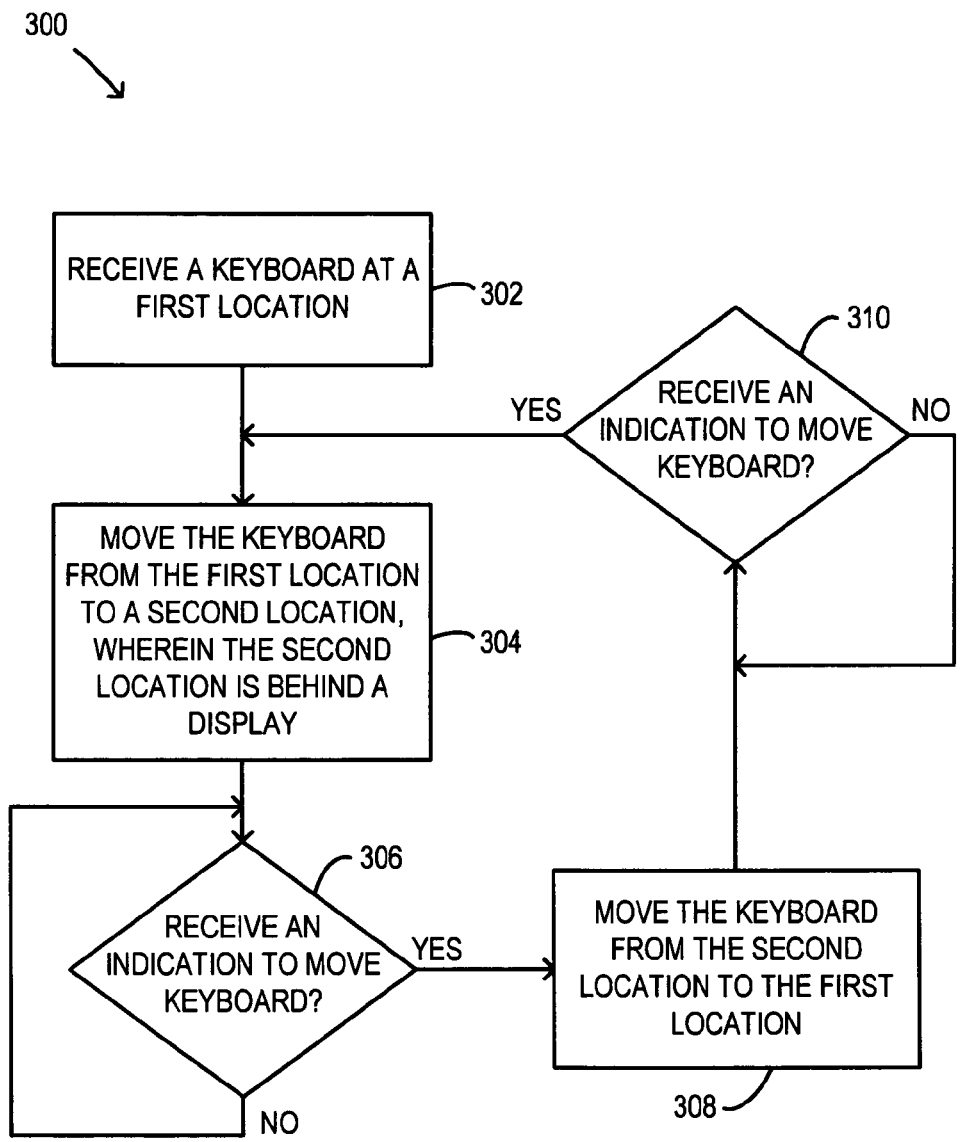
FIG. 3 is a flow diagram of a method according to some embodiments.

Referring now to FIG. 3, a method 300 according to some embodiments is shown. In some embodiments, the method 300 may be conducted by and/or by utilizing the systems 100, 200 and/or may be otherwise associated with the systems 100, 200 described in conjunction with any of FIG. 1 and/or FIG. 2 herein. The flow diagram of the method 300 does not necessarily imply a fixed order to the actions, and embodiments may be performed in any order that is or becomes practicable. Note that the method 300 may be performed by hardware, software (including microcode), firmware, manual means, or any combination thereof. For example, a storage medium may store thereon instructions that when executed by a machine result in performance according to any of the embodiments described herein.

In some embodiments, the method 300 may begin at 302 to receive a keyboard at a first location. For example, the keyboard (such as keyboard 120, 220) may be placed, by a user and/or other entity or device, in a first location associated with a computer. The first location may be or include, according to some embodiments, a location on and/or near the base 106, 206 of the support 104, 204 for the display 102, 202 of the computer. In some embodiments, the first location may be substantially near and/or otherwise associated with the location of the sensor 212. The first location may, according to some embodiments, be a location that is associated with coupling the keyboard to a device capable of moving the keyboard. For example, a device to move the keyboard may be capable of being coupled to the keyboard when the keyboard is located at the first location. In some embodiments, the first location may also or alternatively be a location in which the keyboard is accessible for use.

The method 300 may continue at 304, according to some embodiments, to move the keyboard from the first location to a second location. The second location may, for example, be a location behind the display (such as display 102, 202) of a computer. In some embodiments, the second location may be within an area (such as area 214) that is disposed between the display and another object. For example, the second location may be between the display and a support for the display. According to some embodiments, such as where the display is associated with an AIO computer, the second location may be substantially between the display and the computer and/or computer chassis of the AIO computer. In some embodiments, in the case that the keyboard is positioned in the second location, a user viewing the display may be unable to see the keyboard (e.g., the keyboard may be hidden and/or concealed). In some embodiments, the detection of the keyboard (e.g., by the sensor 212) at the first location may automatically cause the keyboard to be moved to the second location, at 304. According to some embodiments, an indication may be received prior to 304 that causes the keyboard to be moved at 304.

In some embodiments for example, the method 300 may continue at 306 to receive an indication to move the keyboard. An indication may be received from various entities and/or devices. For example, a user may utilize a button (such as button 110, 210) and/or another input device (e.g., the keyboard) to indicate that the keyboard is desired to be moved. In some embodiments, the indication may specify where the keyboard is to be moved. For example, one button may be provided for indicating that the keyboard is to be moved from the first location to the second location (e.g., the keyboard is to be stored or hidden), and one button may be provided for indicating that the keyboard is to be moved from the second location to the first location (e.g., the keyboard is to be deployed or made visible). In some embodiments, the keyboard may be moveable to more locations than the first and second locations described for illustrative purposes herein.

In some embodiments, an indication may be received from a computer component such as a computer processor. The processor may determine, for example, that because an AIO computer is being used and/or is desired to be used as a computer, the keyboard is necessary and is to be deployed (e.g., moved from the second location) while the computer functionality is being used. According to some embodiments, if no indication is received, then the keyboard may remain in the second location behind the display. The method 300 may pause at 306 until an indication is received, according to some embodiments. In some embodiments, any indication associated with moving the keyboard to a location where the keyboard is already positioned may be ignored. If an indication is received indicating that the AIO computer is to be used as a DVD player (e.g., the keyboard may not be needed), for example, and the keyboard is already stowed in the second position, then no movement may be necessary to position the keyboard appropriately. Accordingly, such an indication may be ignored.

The method 300 may continue, according to some embodiments, to move the keyboard from the second location to the first location, at 308. For example, if an indication is received at 306, the keyboard may be moved from behind the display to the first location. In some embodiments, a user may indicate at 306 that the keyboard is desired to be used. Accordingly, the keyboard may be moved at 308 from behind the display to a position where the user may utilize and/or acquire the keyboard. According to some embodiments, if the keyboard is otherwise determined to be useful and/or necessary (e.g., the processor and/or software of the AIO computer determines that the keyboard may be useful), an indication may be provided (e.g., at 306) that causes a device to move the keyboard to the first location, at 308.

In some embodiments, the method 300 may continue to receive an indication to move the keyboard at 310. If no indication is received, the keyboard may not be moved and/or the method 300 may pause at 310 until an indication is received. According to some embodiments, if an indication is received at 310, then the method 300 may return to 304 to move the keyboard from the second location to the first location. In some embodiments, indications may be constantly, continuously, intermittently, and/or otherwise monitored to determine if the keyboard is to be moved. According to some embodiments, indications may be received in any form, configuration, quantity, and/or type that is or becomes known.

Figure 4:
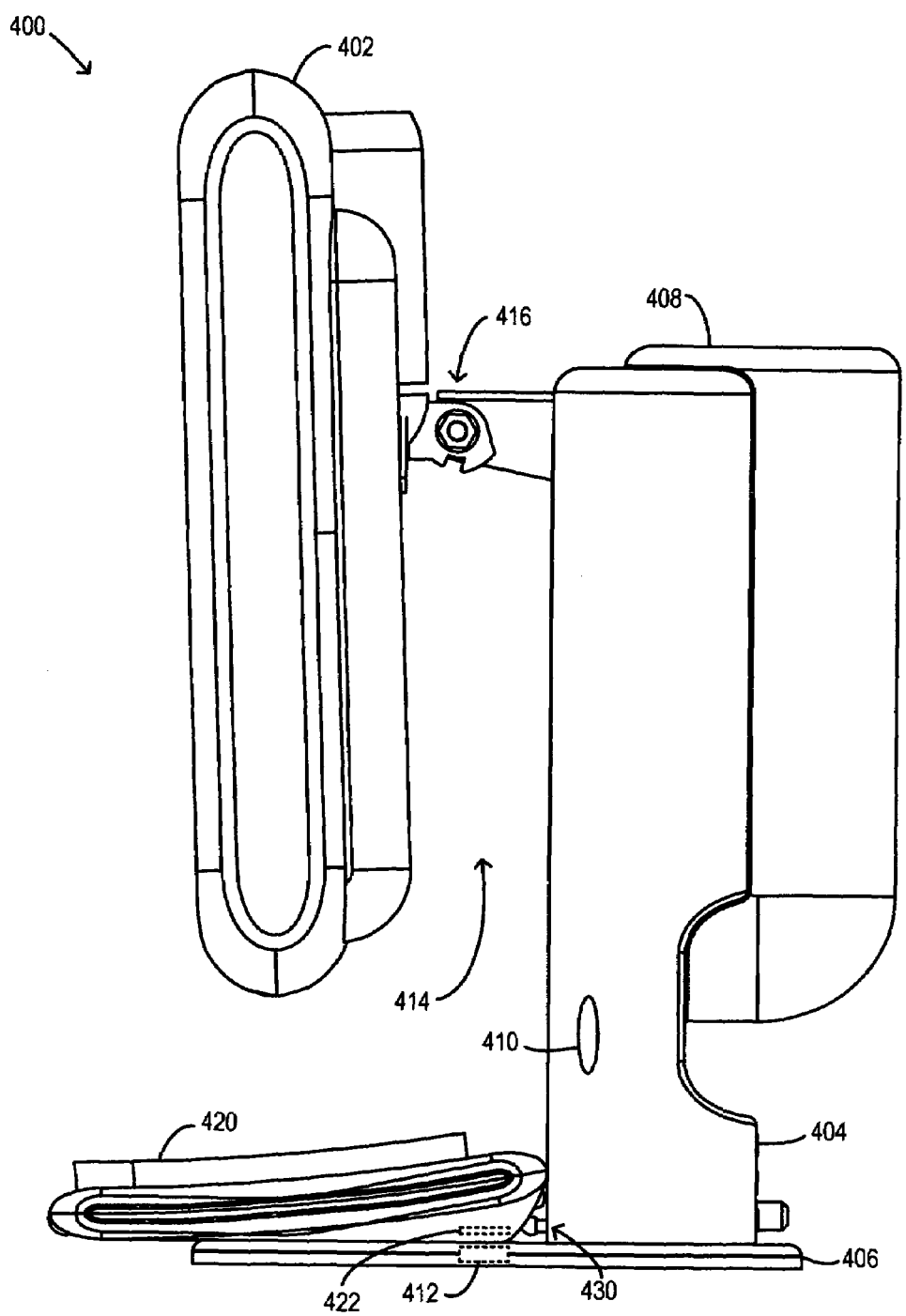
FIG. 4 is a side view of a system according to some embodiments.

Turning now to FIG. 4, a side view of a system 400 according to some embodiments is shown. In some embodiments, the system 400 may be similar to the systems 100, 200 described in conjunction with any of FIG. 1 and/or FIG. 2 herein. The system 400 may, according to some embodiments, be utilized in accordance with and/or otherwise associated with the method 300 described herein. The system 400 may include, according to some embodiments, a display 402, a support for the display 404, a support base 406, a computer chassis 408, and/or one or more buttons 410. In some embodiments, the system 400 may also or alternatively include a sensor 412, an area 414 between the display 402 and the support 404, a coupling 416, and/or a keyboard 420. According to some embodiments (such as shown in FIG. 4), the keyboard 420 may include a sensor 422. The system 400 may also or alternatively include a device 430 to move the keyboard 420. In some embodiments, the components 402, 404, 406, 408, 410, 412, 414, 420 of the system 400 may be similar in configuration and/or functionality to the similarly-named components described in conjunction with any of FIG. 1 and/or FIG. 2 herein.

In some embodiments, the display 402 may be attached to the support 404 via the coupling 416. The coupling 416 may, for example, distance the display 402 from the stand 404 and/or define the area 414 between the display 402 and the stand 404. In some embodiments, the keyboard 420 may be moved into the area 414. For example, the keyboard 420 may be manually, mechanically, and/or electronically moved into the area 414 behind the display 402. In some embodiments, the keyboard 420 may be moved into the area 414 in the case that the keyboard 420 is not required to be positioned for use (e.g., in the case that the system 400 is used as a DVD player and/or other device not requiring a keyboard).

According to some embodiments, the keyboard 420 may be placed on the base 406 of the support 404 (as shown in FIG. 4). In some embodiments, this may constitute receiving the keyboard 420 at a first location (e.g., as at 302 in method 300). For example, the sensor 412 (either alone, or in concert with the sensor 422) may detect the keyboard 420 in the first location (e.g., the location on the base 406 of the support 404). An indication of the detection of the keyboard 420 may then, for example, be provided to the device 430. In some embodiments, the indication may also or alternatively be provided to other system 400 components. According to some embodiments for example, the indication may be provided to a processor (not shown) within the computer chassis 408. The processor may then, in some embodiments, cause the device 430 to move the keyboard 420.

According to some embodiments, a user may provide an indication associated with moving the keyboard 420. For example, if the user desires that the keyboard 420 be moved into the area 414 behind the display 402, the user may press the button 410. The button 410 may provide an indication to other system 400 components to cause the device 430 to move the keyboard 420 as desired. In some embodiments, the device 430 may directly receive the indication and may initiate movement of the keyboard 420. The device 430 may, for example, move the keyboard 420 from the first location (e.g., on and/or near the base 406 of the support 404) to a second location behind the display 402 (e.g., in the area 414).

Figure 5:
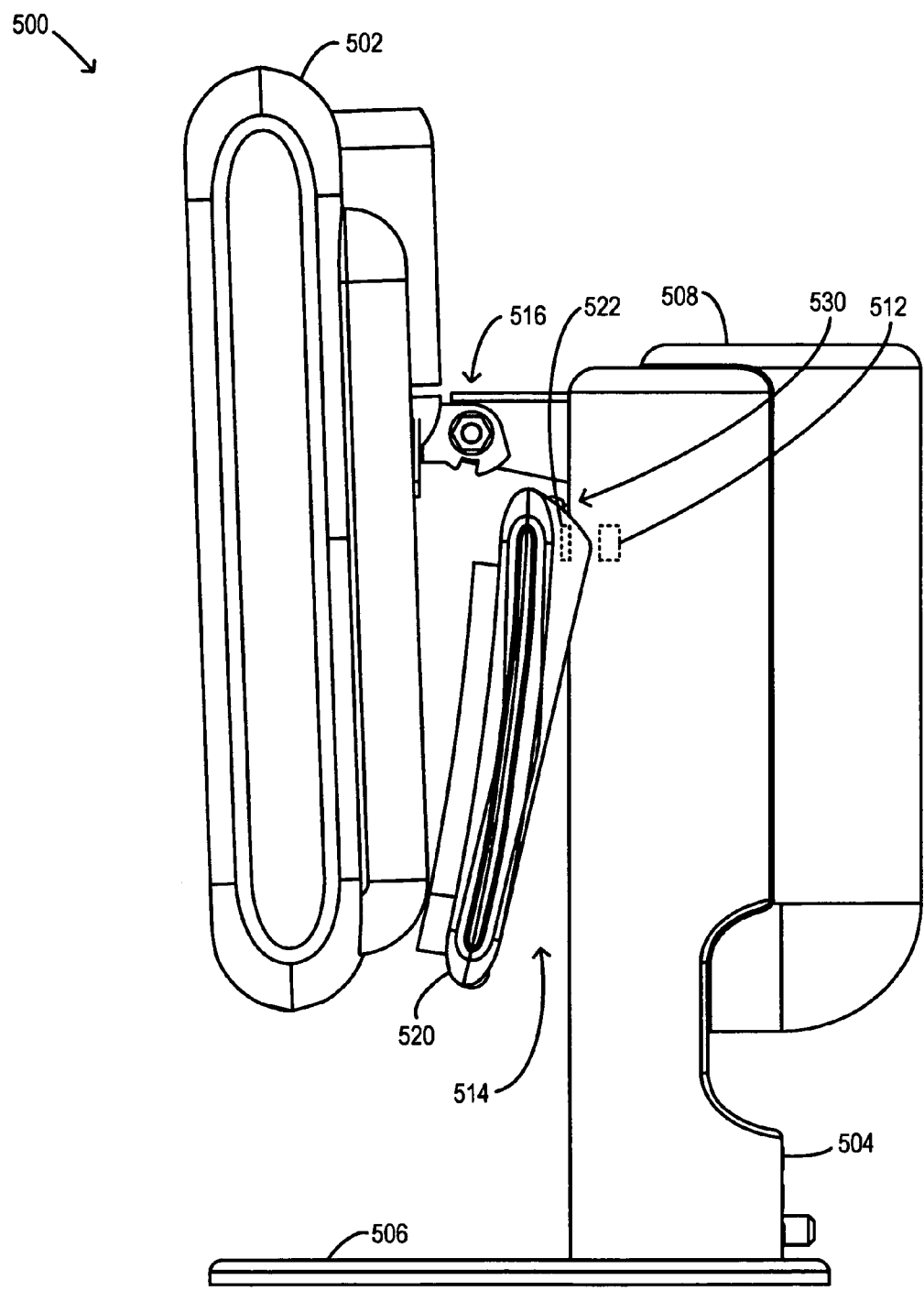
FIG. 5 is a side view of a system according to some embodiments.

Turning to FIG. 5, a side view of a system 500 according to some embodiments is shown. In some embodiments, the system 500 may be similar to the system 400 and/or the other systems 100, 200 described in conjunction with any of FIG. 1, FIG. 2, and/or FIG. 4 herein. The system 500 may, according to some embodiments, be utilized in accordance with and/or otherwise associated with the method 300 described herein. The system 500 may include, according to some embodiments, a display 502, a support for the display 504, a support base 506, and/or a computer chassis 508. In some embodiments, the system 500 may also or alternatively include a sensor 512, an area 514 between the display 502 and the support 504, a coupling 516, and/or a keyboard 520. According to some embodiments (such as shown in FIG. 5), the keyboard 520 may include a sensor 522. The system 500 may also or alternatively include a device 530 to move the keyboard 520. In some embodiments, the components 502, 504, 506, 508, 512, 514, 516, 520, 522, 530 of the system 500 may be similar in configuration and/or functionality to the similarly-named components described in conjunction with any of FIG. 1, FIG. 2, and/or FIG. 4 herein.

In some embodiments (such as shown in FIG. 5), the keyboard 520 may be positioned in a location behind the display 502 and/or within the area 514 between the display 502 and the support 504. This may, for example, be the second position that the keyboard 520 is moved to in the case that the keyboard 520 is received at a first location (e.g., at 302 in method 300) and/or in the case that an indication is received (e.g., at 304 in method 300). According to some embodiments, the device 530 may couple to the keyboard 520 and may move the keyboard 520 to the second location.

The device 530 may also or alternatively, for example, remain coupled to the keyboard 520 to prevent the keyboard 520 from falling out of the area 514 and/or otherwise moving substantially from the second location.

In some embodiments, the system 500 may include the sensors 512, 522. The sensors 512, 522 may, for example, be similar in configuration and/or functionality to the sensors 412, 212, 422 described in conjunction with any of FIG. 2 and/or FIG. 4 herein. In some embodiments, the sensors 512, 522 may be located within and/or on other system 500 components and/or be configured or located differently than shown in FIG. 5. According to some embodiments, either or both of the sensors 512, 522 may detect the keyboard 520 when it is positioned in the second location (e.g., as shown in FIG. 5).

In some embodiments, if the keyboard 520 is detected at (and/or substantially at) the second location by either or both of the sensors 512, 522, the device 530 may be stopped from further moving the keyboard 520. For example, in the case that the keyboard 520 is moved from the first location to the second location behind the display 502, the device 530 may stop moving the keyboard 520 when the second location is reached (e.g., the keyboard is detected at or near the second location). In some embodiments, the sensors 512, 522 may be also or alternatively used to determine if an indication associated with moving the keyboard 520 is appropriate. For example, if an indication is received to move the keyboard 520 to the second position, the sensors 512, 522 may determine that the keyboard 520 is already at the second location, and the device 530 may accordingly not be activated to move the keyboard 520.

Figure 6:
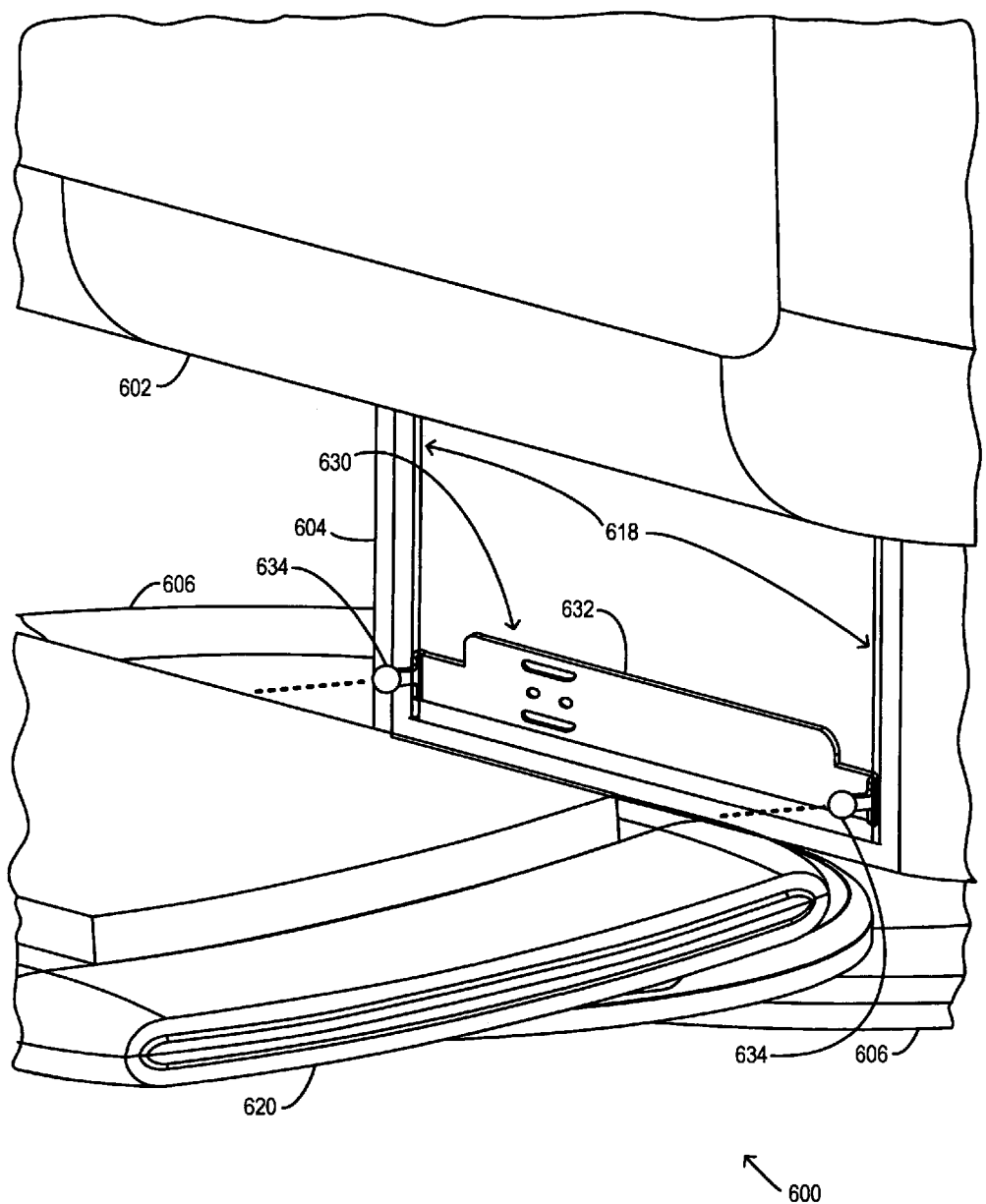
FIG. 6 is a perspective diagram of a system according to some embodiments.

In FIG. 6, a perspective diagram of a system 600 according to some embodiments is shown. In some embodiments, the system 600 may be similar to the systems 100, 200, 400, 500 described in conjunction with any of FIG. 1, FIG. 2, FIG. 4, and/or FIG. 5 herein. The system 600 may, according to some embodiments, be utilized in accordance with and/or otherwise associated with the method 300 described herein. The system 600 may include, according to some embodiments, a display 602, a support for the display 604, and/or a support base 606. In some embodiments, the system 600 may also or alternatively include a path 618, a keyboard 620, and/or a device 630 to move the keyboard 620. According to some embodiments (such as shown in FIG. 6), the device 630 may include a carrier bracket 632 and/or one or more projections 634 to couple to the keyboard 620. In some embodiments, the components 602, 604, 606, 620, 630 of the system 600 may be similar in configuration and/or functionality to the similarly-named components described in conjunction with any of FIG. 1, FIG. 2, FIG. 4, and/or FIG. 5 herein.

In some embodiments, the device 630 to move the keyboard 620 may be or include the carrier bracket 632. The carrier bracket 632 may comprise any shape, configuration, and/or type of device that is or becomes known or practicable. In some embodiments, the carrier bracket 632 may be coupled to the support 604. The device 630 may also or alternatively, according to some embodiments, comprise any number and/or type of projections 634. As shown in FIG. 6, for example, the device 630 may include one projection 634 on each of the opposing lateral ends of the carrier bracket 632. In some embodiments, the projections 634 may couple to the keyboard 620. The keyboard 620 may, for example, be moved in accordance with the dotted-lines shown in FIG. 6 to engage and/or otherwise couple with the projections 634 of the device 630.

According to some embodiments, the device 630 may also or alternatively be coupled to the support 604. The device 630 and/or the carrier bracket 632 may, for example, be mounted to the support 604 and/or may be positioned in the track and/or path 618 defined by the support 604. In some embodiments, the device 630 may couple to the keyboard 620 (e.g., via the projections 634) and travel along the path 618 (e.g., via the carrier bracket 632) to move the keyboard 620. Movement of the carrier bracket 632 along the path 618 may, for example, cause the keyboard 620 coupled to the device 630 to be moved to a location behind the display 602 (e.g., a second location). In some embodiments, various other devices not shown in FIG. 6 may be utilized to move and/or facilitate the movement of the carrier bracket 632, the device 630, and/or the keyboard 620. The system 600 may include, for example, a motor, a cable, a chain, a pulley, and/or any other device that is or becomes known or practicable to facilitate movement of the carrier bracket 632, the device 630, and/or the keyboard 620.

Figure 7:
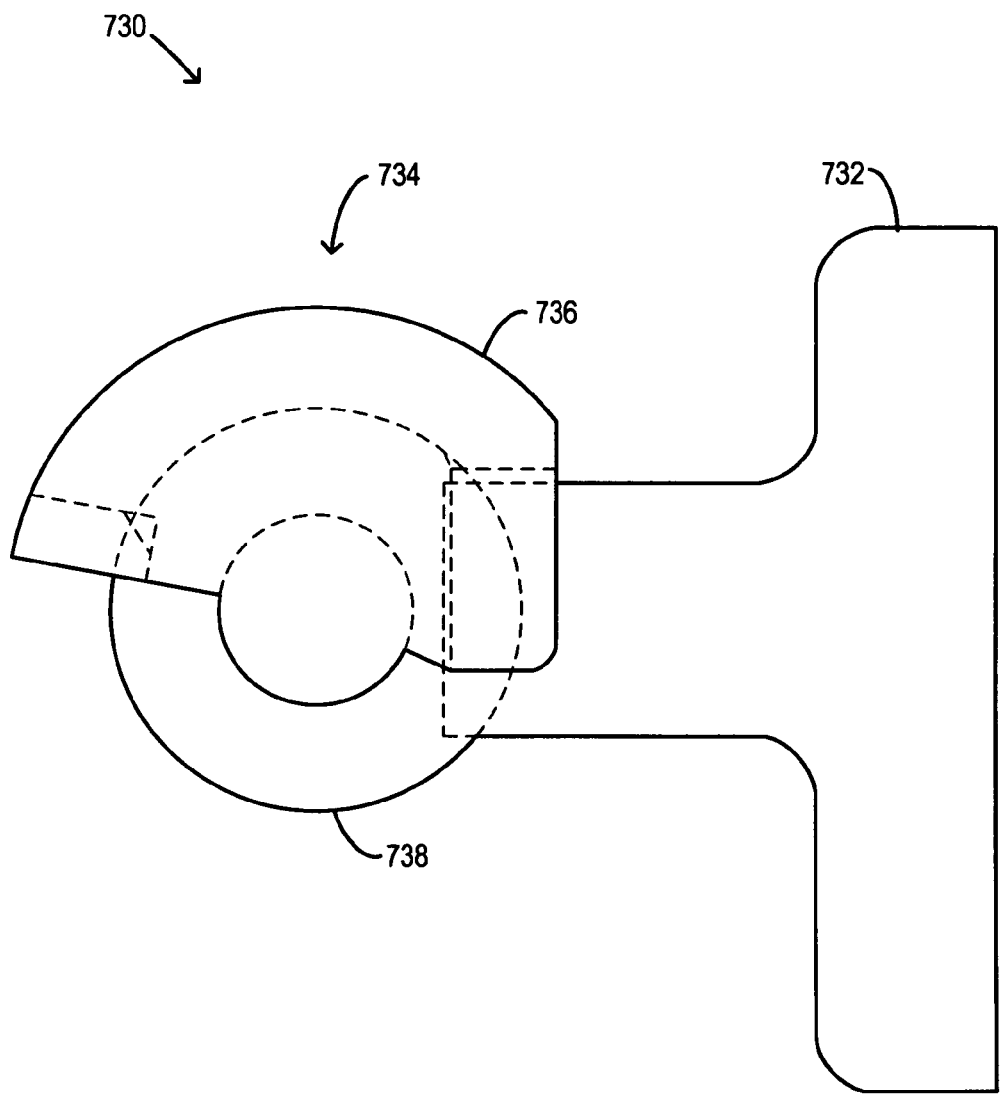
FIG. 7 is a diagram of a device according to some embodiments.

In FIG. 7, a diagram of a device 730 according to some embodiments is shown. In some embodiments, the device 730 may be utilized in the systems 100, 200, 400, 500, 600 described in conjunction with any of FIG. 1, FIG. 2, FIG. 4, FIG. 5, and/or FIG. 6 herein. The device 730 may, according to some embodiments, be utilized in accordance with and/or otherwise associated with the method 300 described herein. In some embodiments, the device 730 may be similar to the device 430, 530, 630 used to move a keyboard, as described elsewhere herein. The device 730 may include, according to some embodiments, a carrier bracket 732, a projection 734, a shaped element 736, and/or a sphere 738. In some embodiments, the components 732, 734 of the device 730 may be similar in configuration and/or functionality to the similarly-named components described in conjunction with any of FIG. 4, FIG. 5, and/or FIG. 6 herein.

In some embodiments, the carrier bracket 732 may be or include any type of bracket and/or device that is capable of coupling to a computer component such as a display support (e.g., support 104, 204, 404, 504, 604). The carrier bracket 732 may, for example, couple to a track and/or path (e.g., path 618) defined by a display support. According to some embodiments, the carrier bracket 732 may be moved along the path of the display support by a motor, cable, pulley, and/or any other device and/or combination of devices. In some embodiments (such as shown in FIG. 7), the carrier bracket 732 may also or alternatively be coupled to a projection 734. In some embodiments, the projection 734 may be a part or portion of the carrier bracket 732 (i.e., as opposed to a separate and attached object).

The projection 734 may, according to some embodiments, include the shaped element 736 and/or the sphere 738. The shaped element 736 may, for example, be designed and/or otherwise configured to couple to a keyboard (not shown in FIG. 7). The projection 734 and/or the shaped element 736 may, for example, be inserted into a receptacle in the keyboard. In some embodiments, the sphere 738 may facilitate coupling of the keyboard to the projection 734 and/or the shaped element 736. For example, the sphere 738 may facilitate entrance of the projection 734 and/or the shaped element 736 into the receptacle of the keyboard. In some embodiments, the sphere 738 may be disposed within an opening defined by the shaped element 736. As shown in FIG. 7 for example, the sphere 738 may be partially disposed within the opening of the shaped element 736. The portion of the sphere 738 that protrudes from the opening defined by the shaped element 736 may, for example, contact a surface of the keyboard receptacle to allow the projection 734 and/or the shaped element 736 to roll into the receptacle (e.g., reducing friction and facilitating coupling and/or uncoupling).

In some embodiments, the shape of the shaped element 736 may be configured to allow coupling of the projection 734 to the keyboard. According to some embodiments, the shape of the shaped element 736 may allow coupling to the keyboard in certain orientations, while it may prevent uncoupling of the keyboard from the projection 734 and/or the shaped element 736 in other orientations. In the case that the keyboard is positioned in the first location as described herein, for example, the shaped element 736 may be capable of being inserted into the receptacle on the keyboard. In the case that the keyboard is positioned in the second location as described herein, in some embodiments the shaped element 736 may not be removable and/or detachable from the receptacle on the keyboard.

For example, the shaped element 736 and/or the projection 734 may include one or more portions that are configured to enter the receptacle of the keyboard when the keyboard is placed in a substantially horizontal position (e.g., the first position). If the keyboard is moved and/or oriented at a different angle with respect to the projection 734 (and/or the shaped element 736), the one or more portions may be substantially prevented from being removed and/or detached from the keyboard receptacle. In some embodiments, the sphere 738 may facilitate the rotation of the keyboard with respect to the shaped element 736 and/or the projection 734.

Figure 8:
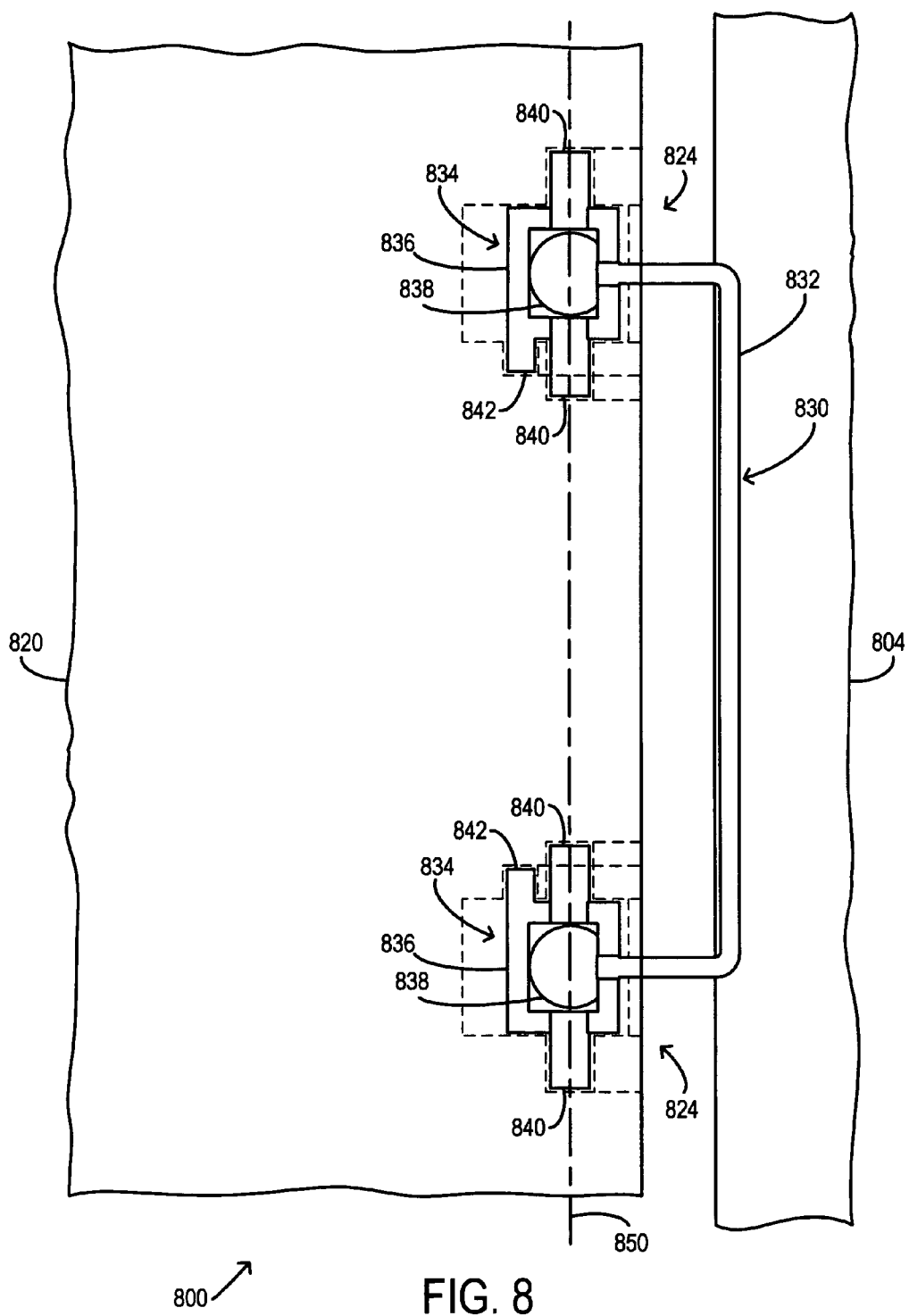
FIG. 8 is a diagram of a system according to some embodiments.

Referring to FIG. 8, a diagram of a system 800 according to some embodiments is shown. In some embodiments, the system 800 may be similar to the systems 100, 200, 400, 500, 600 described in conjunction with any of FIG. 1, FIG. 2, FIG. 4, FIG. 5, and/or FIG. 6 herein. The system 800 may, according to some embodiments, be utilized in accordance with and/or otherwise associated with the method 300 described herein. The system 800 may include, according to some embodiments, a display support 804 and/or a keyboard 820. The keyboard 820 may, according to some embodiments, include one or more receptacles 824 (indicated by the dotted-lines). In some embodiments, the system 800 may also or alternatively include a device 830 to move the keyboard 820. The device 830 may, according to some embodiments, include a carrier bracket 832, one or more projections 834, one or more shaped elements 836, and/or one or more spheres 838. In some embodiments, the shaped elements 836 may include one or more first portions 840, and/or one or more second portions 842. In some embodiments, the components 804, 820, 830, 832, 834, 836, 838 of the system 800 may be similar in configuration and/or functionality to the similarly-named components described in conjunction with any of FIG. 1, FIG. 2, FIG. 4, FIG. 5, FIG. 6, and/or FIG. 7 herein.

According to some embodiments (such as shown in FIG. 8), the projections 834 and/or the shaped elements 836 of the device 830 may be disposed within the receptacles 824 of the keyboard 820. The projections 834 may, for example, be inserted into the receptacle 824 to couple the keyboard 820 to the device 830. In some embodiments, in the case that the projections 834 are disposed within the receptacles 824, the keyboard 820 may be considered to be positioned in the first location as described herein. According to some embodiments, the spheres 838 associated with the projections 834 (and/or disposed within openings defined by the shaped elements 836) may facilitate insertion and/or removal of the projections 834 from the receptacles 824. The spheres 838 may, for example, allow the projections 834 to roll along a surface of the receptacles 824. Note that in some embodiments, the diagram of system 800 may be considered to show a cut-away and/or cross-sectional view of some and/or all components (e.g., the projections 834 and/or the spheres 838 may not ordinarily be visible in the absence of a cross-sectional view because of visual interference by portions of the keyboard 820 and/or the shaped elements 836, respectively).

In some embodiments, the coupling of the projections 834 and/or the shaped elements 836 to the keyboard 820 may define an axis 850. The first portions 840 of the shaped elements 836 may, for example, define the axis 850 around which the keyboard 820 may rotate. According to some embodiments, such as where the keyboard 820 may be lifted from one end (e.g., where the projections 834 are coupled) during movement of the keyboard to a location behind a display, the keyboard 820 may rotate about the axis 850 as gravity causes the other end of the keyboard 820 to remain beneath the raised end. In some embodiments, other axes and/or rotations may be associated with the keyboard 820 during movement.

In some embodiments, the receptacles 824 may be configured to allow insertion and/or removal of the projections 834 from the receptacles 824, but may not allow substantial rotation of the keyboard 820 with respect to the axis 850. If the receptacles 824 do not extend substantially around a portion of the axis 850, for example, then the carrier bracket 832 may substantially inhibit the keyboard 820 from rotating around the axis 850. In other words, as the keyboard 820 begins to rotate, the carrier bracket 832 may be forced against a wall of the receptacles 824, preventing substantial and/or further rotation. According to some embodiments, the receptacles 824 may extend such that the projections 834 may be removed from the receptacles 824 regardless of the angle the keyboard 820 forms with respect to the axis 850.

For example, if the receptacles 824 substantially extend around a portion of the axis 850, then the cross-section of the opening of the receptacles 824 may remain substantially constant (e.g., with respect to the device 830) during keyboard 820 rotation. In other words, the carrier bracket 832 may not be forced against a wall of the receptacles 824, and/or the projections 834 may be inserted and/or removed, at least because the opening of the receptacle remains substantially the same (with respect to the device 830) throughout keyboard 820 rotation. In some embodiments, the receptacles 824 may be configured to allow keyboard rotation as described herein, but may inhibit the detachment of the projections 834 (and/or the shaped portions 836) from the keyboard 820.

For example, in the case that the keyboard 820 is oriented in a first location at a first rotational angle with respect to the axis 850, the projections 834, the shaped elements 836, the first portions 840, and/or the second portions 842 may be capable of insertion and/or removal from the receptacles 824. The opening of the receptacles 824 may, for example, have a first cross-sectional configuration when the keyboard 820 is oriented in the first location. The first cross-sectional configuration may, in some embodiments, allow the projections 834 and/or other components of the device 830 to be freely inserted and/or removed from the receptacles 824.

In some embodiments, in the case that the keyboard is substantially moved from the first location and/or is substantially rotated with respect to the axis 850, the opening of the receptacles 824 may have a second cross-sectional configuration. The second cross-sectional configuration may, for example, not include opening areas allowing components of the device 830 to be removed from the receptacles 824. For example, the first portions 840 and/or the second portions 842 of the shaped elements 836 may be blocked from being removed from the receptacles 824 at certain orientation of the keyboard 820. In some embodiments, the configuration of the receptacles 824 and/or of the components of the device 830 may allow the keyboard 820 to be secured to the device 830 while the keyboard 820 is being moved and/or once the keyboard reaches the second location as described herein (e.g., behind the display).

Figure 9:
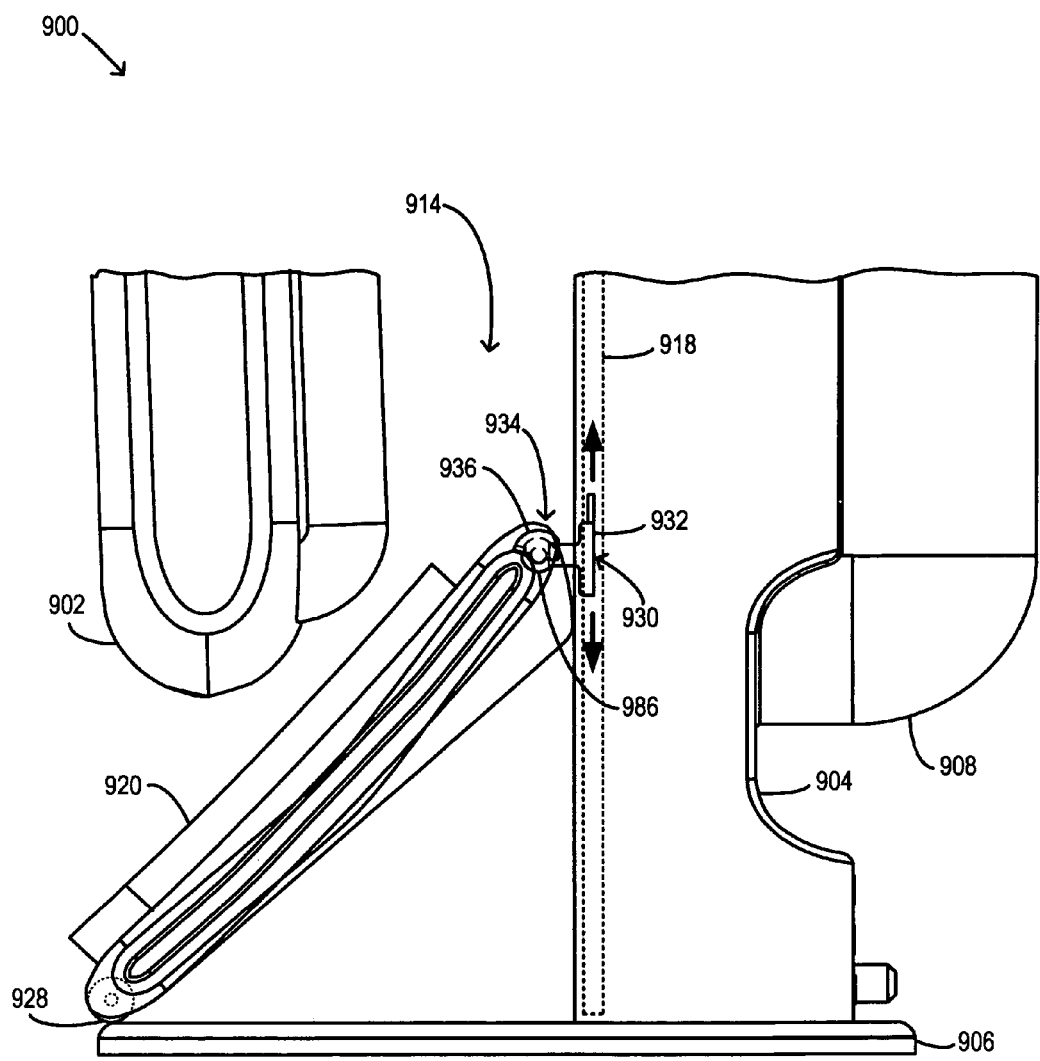
FIG. 9 is a side view of a system according to some embodiments.

Turning now to FIG. 9, a side view of a system 900 according to some embodiments is shown. In some embodiments, the system 900 may be similar to the systems 100, 200, 400, 500, 600, 800 described in conjunction with any of FIG. 1, FIG. 2, FIG. 4, FIG. 5, FIG. 6, and/or FIG. 8 herein. The system 900 may, according to some embodiments, be utilized in accordance with and/or otherwise associated with the method 300 described herein. The system 900 may include, according to some embodiments, a display 902, a support 904 for the display 902, a base 906 for the support 904, a computer chassis 908, and area 914 behind the display 902, and/or a path or track 918. In some embodiments, the system 900 may also or alternatively include a keyboard 820. The keyboard 920 may, according to some embodiments, include a roller 928. In some embodiments, the system 900 may include a device 930 to move the keyboard 920. According to some embodiments, the device 930 may include a carrier bracket 932, a projection 934, a shaped element 936, and/or a sphere 938. In some embodiments, the components 902, 904, 906, 908, 914, 920, 930, 932, 934, 936, 938 of the system 900 may be similar in configuration and/or functionality to the similarly-named components described in conjunction with any of FIG. 1, FIG. 2, FIG. 4, FIG. 5, FIG. 6, FIG. 7, and/or FIG. 8 herein.

According to some embodiments, the device 930 may move the keyboard 920 to a location behind the display 902. In some embodiments, the device 930 may also or alternatively move the keyboard 920 from a location behind the display 902 to a location substantially near and/or on the base 906 of the support 904. According to some embodiments (such as shown in FIG. 9), the keyboard 920 may be lifted and/or lowered by the device 930. The device 930 may, for example, include the carrier bracket 932 that may couple to the support 904 and/or may travel along the path 918. The carrier bracket 932 may, in some embodiments, travel in accordance with the arrows shown in FIG. 9 to move the keyboard 920.

In some embodiments, the projection 934 of the device 930 may couple to the keyboard 920. The sphere 938 may, for example, facilitate the insertion of the shaped element 936 (and/or the projection 934) into a receptacle of the keyboard 920. As the device 930 lifts the keyboard 920 from a first location (e.g., near and/or on the base 906), the left-side of the keyboard (e.g., the side not coupled to the device 930) may begin to slide along the surface of the base 906. According to some embodiments, the keyboard 920 may include the roller 928 to facilitate movement of the keyboard 920. The roller 928 may, for example, roll along the surface of the base 906, reducing friction between the keyboard 920 and the base 906 (e.g., facilitating movement of the keyboard 920). The roller 928 may be or include any type and/or configuration of movement facilitating device that is or becomes known. The roller 928 may include, for example, a wheel, a skid, and/or any other type of friction-reducing device and/or component that is or becomes known or practicable. Any number, type, and/or configuration of rollers 928 may, according to some embodiments, be included on the keyboard 920.

Figure 10:
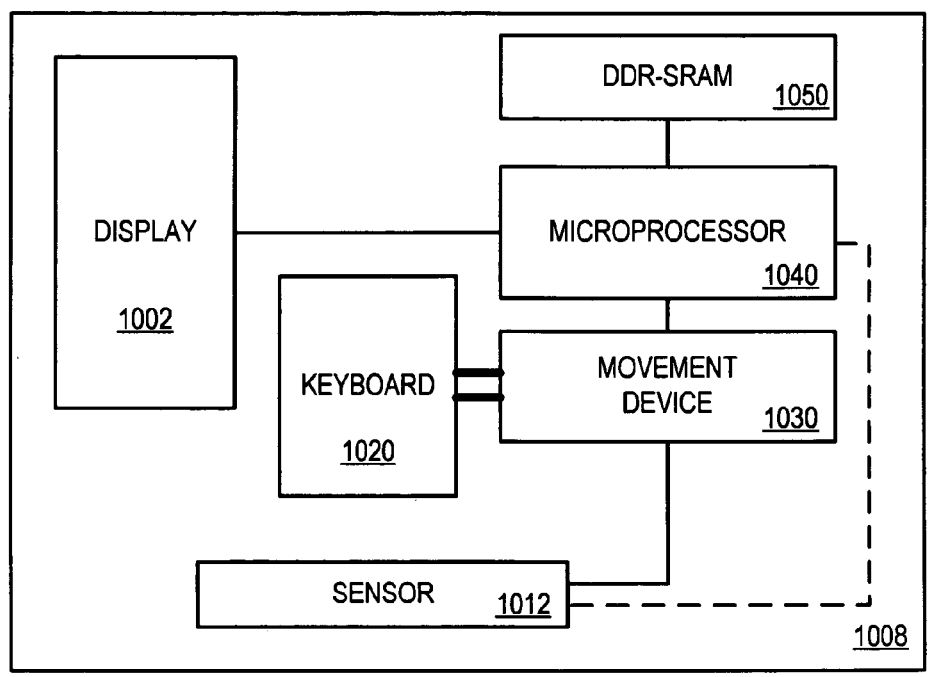
FIG. 10 is a block diagram of a system according to some embodiments.

Referring now to FIG. 10, a block diagram of a system 1000 according to some embodiments is shown. The system 1000 may include, for example, a display 1002, an AOI computer chassis 1008, a sensor 1012, a keyboard 1020, a movement device 1030, a microprocessor 1040, and/or a Double Data Rate-Synchronous Random Access Memory (DDR-SRAM) 1050 device. In some embodiments, the display 1002, the DDR-SRAM 1050, and/or the movement device 1030 may be coupled to and/or otherwise in communication with the microprocessor 1040. According to some embodiments, the sensor 1012 may also or alternatively be in communication with the movement device 1030 and/or the microprocessor 1040. In some embodiments, the components 1002, 1008, 1012, 1020, 1030 of the system 1000 may be similar in configuration and/or functionality to the similarly-named components described in conjunction with any of FIG. 1, FIG. 2, FIG. 4, FIG. 5, FIG. 6, FIG. 7, FIG. 8, and/or FIG. 9 herein.

The display 1002 may be any type of display including, but not limited to, a LCD, a Light-Emitting Diode (LED) display, and/or a Cathode Ray Tube (CRT) display. In some embodiments, the display 1002 may be a touch-screen display that is capable of providing indications to the microprocessor 1040. The microprocessor 1040 may be any type, quantity, and/or configuration of processor that is or becomes known. The microprocessor 1040 may be, for example, an Intel® Pentium® 4 3.2 GHz Processor with Hyper-Threading Technology. In some embodiments, the microprocessor 1040 may be in communication with the DDR-SRAM 1050. The DDR-SRAM 1050 may, for example, store various information associated with the system 1000 and/or associated with the movement of the keyboard 1020. According to some embodiments, the microprocessor 1040 may control the movement device 1030 to move the keyboard 1020 as is desired and/or otherwise appropriate.

In some embodiments, the movement device 1030 may be or include any of the devices 430, 530, 630, 730, 830, 930 described herein. The movement device 1030 may, for example, operate in accordance with, carry out, and/or otherwise be associated with the method 300 described herein. For example, the movement device 1030 may couple to the keyboard 1020 and/or may move the keyboard 1020 (e.g., to a location behind the display 1002). In some embodiments, the sensor 1012 may detect the keyboard 1020 at a first location. The sensor 1012 may then, for example, send an indication of the detection to the movement device 1030 and/or to the microprocessor 1040. According to some embodiments, the microprocessor 1040 may send a signal to the movement device 1030 to cause the movement device 1030 to move the keyboard 1020 to a second location. In some embodiments, the movement device 1030 may automatically move the keyboard 1020 between the first and second positions as is desired and/or otherwise appropriate.

The several embodiments described herein are solely for the purpose of illustration. Other embodiments may be practiced with modifications and alterations limited only by the claims.

What is claimed is:
1. A system, comprising:
a display;
a display stand comprising a base, and a coupling to define an area between the display and the display stand;
a keyboard; and a device coupled to the display stand to move the keyboard from a first location to the area between the display and the display stand, and wherein the device comprises:
  a bracket;
  a motor to move the bracket in a vertical direction;
  a first projection coupled to the bracket and to couple the device to the keyboard; and
  a second projection coupled to the bracket and to couple the device to the keyboard, wherein the first projection is at an opposing lateral end of the bracket from the second projection.

2. The system of claim 1, wherein the first and second projection each comprise a spherical shaped connector.

3. The system of claim 2, wherein the first location is a location near the base of the support.

4. The system of claim 1, further comprising:
a sensor to sense the keyboard at the first location.

5. The system of claim 4, wherein the device moves the keyboard to the area between the display and the display stand based at least in part on the sensing of the keyboard at the first location.

6. The system of claim 1, wherein the keyboard is coupled to the device.

7. The system of claim 6, wherein the keyboard comprises a roller at a first end of the keyboard, wherein the roller rolls on the base when the bracket is moved in a vertical direction.

8. The system of claim 1, wherein the keyboard is detachable from the bracket in a case that the keyboard is at the first location.

9. The system of claim 1, wherein the keyboard is not detachable from the bracket in a case that the keyboard is at the area between the display and the display stand.

10. The system of claim 1, further comprising:
an input device to provide an indication from a user.

11. The system of claim 10, wherein the device is to move the keyboard to the area between the display and the display stand based at least in part on the indication provided by the input device.

12. The system of claim 10, wherein the device is to further move the keyboard from the area between the display and the display stand to the first location based at least in part on the indication provided by the input device.

13. A method comprising:
receiving a keyboard at a first location;
moving the keyboard from the first location to a second location, wherein the second location is an area between a display and a display stand, wherein a device is coupled to the display stand to move the keyboard from the first location to the area between the display and the display stand, and wherein the device comprises:
  a bracket;
  a motor to move the bracket in a vertical direction;
  a first projection coupled to the bracket and to couple the device to the keyboard; and
  a second projection coupled to the bracket and to couple the device to the keyboard, wherein the first projection is at an opposing lateral end of the bracket from the second projection.

14. The method of claim 13, wherein receiving the keyboard comprises:
coupling the keyboard to the device.

15. The method of claim 14, wherein the keyboard comprises a roller at a first end of the keyboard, wherein the roller rolls on the base when a the bracket is moved in a vertical direction.

16. The method of claim 13, wherein the keyboard is detachable from the bracket in a case that the keyboard is in the first location.

17. The method of claim 13, wherein the keyboard is not detachable from the bracket in a case that the keyboard is in the area between the display and the display stand.

18. The method of claim 13, further comprising:
receiving an indication to move the keyboard from the first location to the area between the display and the display stand.

19. The method of claim 18, wherein the indication is received from a user.

20. The method of claim 13, further comprising:
sensing the keyboard in the first location.

21. The method of claim 20, wherein the keyboard is moved from the first location to the area between the display and the display stand based at least in part on the sensing.

22. The method of claim 13, further comprising:
sensing the keyboard in the area between the display and the display stand.

23. The method of claim 13, further comprising:
receiving an indication to move the keyboard from the area between the display and the display stand to the first location.

24. The method of claim 23, further comprising:
moving the keyboard from the area between the display and the display stand to the first location based at least in part on the received indication.

25. The system of claim 24, wherein the first location is a location near the base of the support.

26. A system, comprising:
a display;
a display stand comprising a base, and a coupling to define an area between the display and the display stand;
a keyboard;
a microprocessor in communication with at least one of the display and the keyboard;
a double data rate-synchronous dynamic random access memory device to store instructions to be executed by the microprocessor; and
a device coupled to the display stand to move the keyboard from a first location to the area between the display and the display stand, and wherein the device comprises:
  a bracket;
  a motor to move the bracket in a vertical direction;
  a first projection coupled to the bracket and to couple the device to the keyboard; and
a second projection coupled to the bracket and to couple the device to the keyboard, wherein the first projection is at an opposing lateral end of the bracket from the second projection.

27. The system of claim 26, wherein the first and second projection each comprise a spherical shaped connector.

28. The system of claim 26, further comprising:
a sensor to sense the keyboard at one or more of the first location and the area between the display and the display stand.

* * * * *